(12) United States Patent
Trimberger

(10) Patent No.: US 7,941,673 B1
(45) Date of Patent: May 10, 2011

(54) COPY PROTECTION WITHOUT NON-VOLATILE MEMORY

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1208 days.

(21) Appl. No.: 11/101,076

(22) Filed: Apr. 7, 2005

Related U.S. Application Data

(62) Division of application No. 09/765,907, filed on Jan. 19, 2001, now Pat. No. 7,380,131.

(51) Int. Cl.
*G06F 21/00* (2006.01)

(52) U.S. Cl. .......... 713/189; 713/161; 713/194; 380/37; 380/41; 380/44; 326/41

(58) Field of Classification Search .................. 713/161, 713/189, 194; 380/21, 37, 41, 44; 326/41
See application file for complete search history.

(56) References Cited

U.S. PATENT DOCUMENTS

| | | | |
|---|---|---|---|
| 4,203,070 A | 5/1980 | Bowles et al. | |
| 4,754,216 A | 6/1988 | Wong | |
| 4,810,975 A * | 3/1989 | Dias ............................... | 331/78 |
| 4,897,652 A | 1/1990 | Leon | |
| 5,007,087 A | 4/1991 | Bernstein et al. | |
| 5,276,734 A | 1/1994 | Hashimoto | |
| 5,450,360 A | 9/1995 | Sato | |
| 5,523,746 A | 6/1996 | Gallagher | |
| 5,828,678 A | 10/1998 | Mock | |
| 5,838,256 A | 11/1998 | Pearson et al. | |
| 5,952,933 A | 9/1999 | Issa et al. | |
| 5,961,577 A | 10/1999 | Soenen et al. | |
| 5,963,043 A | 10/1999 | Nassif | |
| 5,964,881 A | 10/1999 | Thor | |
| 5,970,142 A | 10/1999 | Erickson | |
| 6,002,991 A | 12/1999 | Conn | |
| 6,005,829 A | 12/1999 | Conn | |
| 6,101,624 A | 8/2000 | Cheng et al. | |
| 6,150,837 A | 11/2000 | Beal et al. | |
| 6,185,126 B1 | 2/2001 | Rodgers et al. | |
| 6,215,874 B1 * | 4/2001 | Borza et al. ..................... | 380/46 |
| 6,233,339 B1 | 5/2001 | Kawano et al. | |
| 6,260,146 B1 | 7/2001 | Mos et al. | |
| 6,298,453 B1 * | 10/2001 | Culbertson et al. ............. | 714/30 |

(Continued)

OTHER PUBLICATIONS

U.S. Appl. No. 09/765,907, filed Jan. 19, 2001, Trimberger.

(Continued)

*Primary Examiner* — Carl Colin
(74) *Attorney, Agent, or Firm* — William L. Paradice, III; Thomas George; LeRoy D. Maunu

(57) ABSTRACT

An FPGA includes a plurality of configurable logic elements, a configuration circuit, a decryption circuit, and a fingerprint element. The fingerprint element generates a fingerprint that is indicative of inherent manufacturing process variations unique to the FPGA. The fingerprint is used as a key for an encryption system that protects against illegal use and/or copying of configuration data. In some embodiments, the propagation delay of various circuit elements formed on the FPGA are used to generate the fingerprint. In one embodiment, the specific frequency of an oscillator is used to generate the fingerprint. In some embodiments, a ratio of measurable values may be used to generate the fingerprint. In other embodiments, differences in transistor threshold voltages are used to generate the fingerprint. In still other embodiments, variations in line widths are used to generate the fingerprint.

16 Claims, 6 Drawing Sheets

U.S. PATENT DOCUMENTS

| | | | |
|---|---|---|---|
| 6,351,814 | B1 | 2/2002 | Batinic et al. |
| 6,356,637 | B1 * | 3/2002 | Garnett .................... 380/265 |
| 6,587,978 | B1 | 7/2003 | Merritt et al. |
| 6,604,214 | B1 | 8/2003 | Fukushima |
| 6,791,353 | B1 | 9/2004 | Beal et al. |
| 6,823,069 | B1 * | 11/2004 | Kitajima et al. ............. 380/44 |
| 6,931,543 | B1 * | 8/2005 | Pang et al. .................. 713/193 |
| 6,978,397 | B2 | 12/2005 | Chan |
| 7,240,218 | B2 | 7/2007 | Kean |
| 7,565,541 | B1 * | 7/2009 | Tarbouriech ............... 713/176 |
| 2001/0032318 | A1 | 10/2001 | Yip et al. |
| 2001/0037458 | A1 | 11/2001 | Kean |
| 2002/0018561 | A1 | 2/2002 | Emelko |

OTHER PUBLICATIONS

Eastlake, D. et al., "Randomness Recommendations for Security," Dec. 1994, RFC 1750, downloaded Jan. 27, 2005 from www.faqs.org/rfcs/rfc1750.html, pp. 1-24.

IBM Corporation, "Integrated Circuit Compatible Random Number Generator," IBM Technical Disclosure Bulletin, TBD-ACC-NO: NN8804333, Apr. 1, 1998, vol. 1, Issue No. 11, pp. 333-335.

"The Programmable Logic Data Book 1998", available from Xilinx, Inc., 2100 Logic Drive, San Jose, California 95124, Chapter 4 in its entirety.

Ajluni, Cheryl, "Give Your IP A Unique ID With Silicon Fingerprinting," *Electronic Design*, Feb. 7, 2000, pp. 1-2, Penton Media, Inc., New York, New York, USA.

U.S. Appl. No. 11/151,985, filed Jun. 14, 2005, Trimberger.

U.S. Appl. No. 12/961,753, filed Dec. 7, 2010, Trimberger.

U.S. Appl. No. 12/961,770, filed Dec. 7, 2010, Trimberger.

U.S. Appl. No. 12/962,566, filed Dec. 7, 2010, Trimberger.

Intrinsic-ID, Inc., *Quiddikey*, downloaded Sep. 15, 2010 from www.intrinsic-id.com/products, Intrinsic-ID, Inc., San Jose, California, USA.

Suh, G. Edward et al., "Physical Unclonable Functions for Device Authentication and Secret Key Generation," *Proc. of the 44th ACM/IEEE Design Automation Conference*, Jun. 4, 2007, pp. 9-14, ACM, New York, USA.

Xilinx, Inc., *Using Look-Up Tables as Shift Registers (SRL16) in Spartan-3 Generation FPGAs*, XAPP465 (v1.1), May 20, 2005, pp. 1-17, Xilinx, Inc., San Jose, California, USA.

\* cited by examiner

COPY PROTECTION WITHOUT NON-VOLATILE MEMORY

FIELD OF THE INVENTION

This invention relates generally to programmable logic devices and specifically to protecting circuit designs in programmable logic devices.

BACKGROUND OF THE INVENTION

Programmable logic devices (PLDs) are a well-known type of general purpose integrated circuit that may be programmed to implement one or more desired circuit designs. One type of PLD, a field programmable gate array (FPGA), typically includes an array of identical configurable logic blocks (CLBs) surrounded by input/output blocks (IOBs). Each CLB may be individually programmed to perform a variety of logic functions. A programmable interconnect selectively connects the CLBs to each other and to the various IOBs to implement complex logic functions and circuits.

To program the PLD to implement a circuit design, a user captures the circuit design using a well-known design capture tool, and then uses well-known software tools to convert the captured design into a device specific bitwise representation. The bitwise representation, commonly referred to as a configuration bitstream, is stored in a non-volatile storage device such as a Programmable Read Only Memory (PROM). Upon power-up, the non-volatile storage device transmits the configuration bitstream to the FPGA, where is loaded into a configuration memory array that controls various switches and multiplexers within the CLBs, IOBs, and programmable interconnect to implement the desired circuit design. Once configured, the FPGA implements the circuit design embodied in the configuration data. For a more detailed description of FPGA architecture, configuration, and operation, refer to The Xilinx 1998 Data Book entitled "The Programmable Logic Data Book", Chapter 4, available from Xilinx, Inc., and incorporated herein by reference.

The FPGA's configuration memory array is typically a volatile memory such as Static Random Access Memory (SRAM). Thus, when the FPGA is powered off, the configuration data stored in its configuration memory array is lost. Consequently, when the FPGA is again powered up, it must be re-configured using configuration data provided by the non-volatile storage device, as described above.

The non-volatile storage device is typically external to the FPGA not only because of its size and cost but also because of the complexity of its manufacturing process. For example, the manufacturing process of a PROM requires several more masking and deposition steps than that of an SRAM, because while an SRAM uses cross-coupled transistors to store information, a PROM stores information using floating gate transistors, which require an additional layer of polysilicon. Because of the increased manufacturing complexity of non-volatile memory, as compared to volatile memory, the latest processing technology may be available for manufacturing volatile memory as much as a year or more before it is available for manufacturing non-volatile memory. Accordingly, providing the non-volatile memory external to the FPGA allows the FPGA to be manufactured using the latest manufacturing technology, which in turn provides a competitive advantage.

Because creation of the circuit design embodied in the configuration bitstream requires significant time and expense, it is desirable to protect the configuration data from illegal copying by competitors and unauthorized resellers. Unfortunately, the circuit design for an FPGA may be illegally copied by simply copying the configuration bitstream stored in the non-volatile memory. The copied bitstream may then be used to illegally configure other FPGAs, or may be reverse-engineered to extract the circuit design.

To protect against unauthorized copying, the configuration data may be encrypted before it is stored in the non-volatile memory, transmitted to the FPGA in encrypted form, and then decrypted in the FPGA. Thus, in order to copy the circuit design embodied in the configuration data, one must determine the decryption key, thereby making unauthorized copying difficult. However, because the configuration data must be decrypted each time it is received from the external memory during power-up, the FPGA must include a non-volatile memory to store the decryption key. As discussed above, it is not desirable to include non-volatile memory within the FPGA. Accordingly, there is a need for a method of protecting the configuration data when transmitted to the FPGA that does not require a non-volatile memory within the FPGA.

SUMMARY OF THE INVENTION

A method and apparatus are disclosed that allow for the permanent storage of a decryption key within a PLD such as an FPGA without requiring non-volatile memory on the FPGA. In accordance with the present invention, an FPGA includes a plurality of configurable logic elements, a configuration circuit, a decryption circuit, and a fingerprint element. The fingerprint element generates a fingerprint that is indicative of inherent manufacturing process variations unique to the FPGA. The fingerprint is then used as a key for an encryption system that protects against illegal use and/or copying of the configuration data. In one embodiment, the fingerprint is used as an encryption key to encrypt the configuration data, which in then stored in an external non-volatile storage device such as a PROM. Upon power-up, the fingerprint element generates the fingerprint, and provides the fingerprint to the decryption circuit. The storage device transmits the encrypted configuration data to the FPGA's decryption circuit, which in turn uses the fingerprint as a decryption key to decrypt the encrypted configuration data. The extracted configuration data may then be used to configure the configurable logic elements of the FPGA. Because the fingerprint key is generated each time the FPGA is powered up, the FPGA does not require non-volatile memory for its storage. Accordingly, embodiments of the present invention allow for encryption of the FPGA's configuration data without sacrificing the ability to fabricate the FPGA using the latest silicon manufacturing process technology.

The fingerprint element may generate the fingerprint in response to manufacturing process variations unique to the FPGA in any well-known manner. In some embodiments, differences in propagation delays of various circuit elements on the FPGA are used to generate the fingerprint. In one embodiment, frequency variations in oscillators resulting from differences in propagation delays are used to generate the fingerprint. In another embodiment, differences in transistor threshold voltages are used to generate the fingerprint. In yet another embodiment, variations in line widths are used to generate the fingerprint. In some embodiments, a ratio of measurable values may be used to generate the fingerprint to eliminate fingerprint drift resulting from temperature and voltage fluctuations.

Like components in the Figures are similarly labeled.

DETAILED DESCRIPTION OF THE INVENTION

Figure 1:
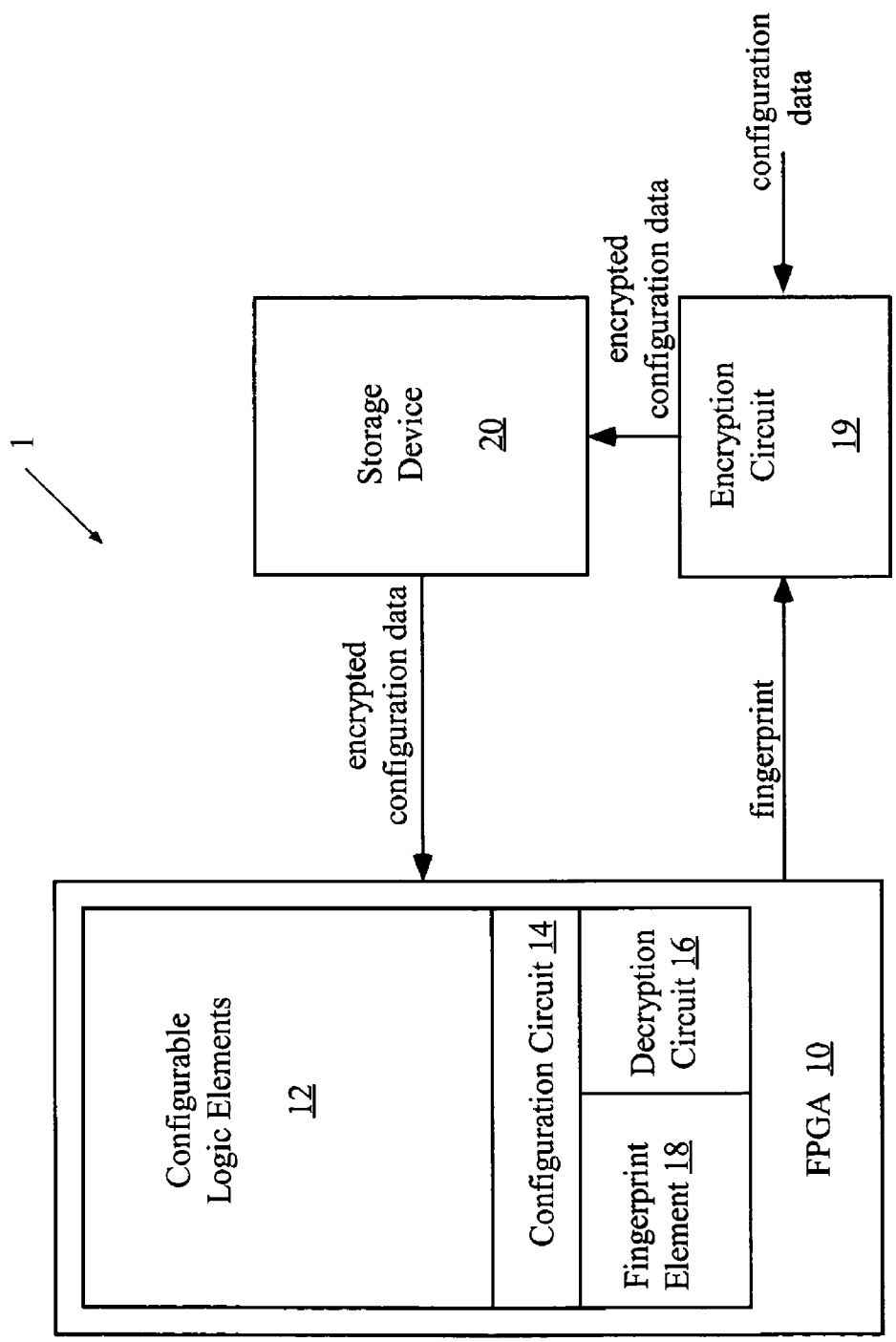
FIG. 1 is a block diagram of an FPGA including a fingerprint element in accordance with the present invention.

FIG. 1 shows a circuit board 1 containing an FPGA 10 in accordance with the present invention that is connected to an encryption circuit 19 and an external storage device 20. The storage device 20 stores, in an encrypted form, configuration data that includes the bitwise representation of a desired circuit design that is to be implemented by the FPGA 10. The storage device 20 may be any non-volatile memory device, and in one embodiment is a PROM. The configuration data is provided to the encryption circuit 19, which in turn encrypts the configuration data in a well-known manner. The encryption circuit 19 provides the encrypted configuration data to the storage device 20 for storage therein. In some embodiments, the encryption circuit 19 uses a fingerprint generated by the fingerprint element 18 of the FPGA 10 as an encryption key to encrypt the configuration data, although other encryption keys may be used. Further, although shown in FIG. 1 as external to the storage device 20, in some embodiments, the encryption circuit 19 is included within the storage device 20.

The FPGA 10 includes a plurality of configurable logic elements 12, a configuration circuit 14, a decryption circuit 16, and a fingerprint element 18. The configurable logic elements 12 include well-known CLBs, IOBs, and a programmable interconnect (not shown for simplicity) that, when configured, implement the desired circuit design. In one embodiment, the configurable logic elements 12 are of the type used in the Virtex family of FPGAs available from Xilinx, Inc., 2100 Logic Drive, San Jose, Calif. 95124, although other FPGA architectures may be used in accordance with the present invention. The configuration circuit 14 is conventional, and controls the loading of configuration data into the configurable logic elements 12. The decryption circuit 16 may be any well-known circuit for decrypting the encrypted configuration data received from the storage device 20.

During power-up of the board 1, the storage device 20 transmits the encrypted configuration data stored therein to the FPGA 10. The fingerprint element 18 generates a fingerprint that is indicative of inherent manufacturing process variations characteristic of the FPGA 10. In accordance with the present invention, the decryption circuit 16 uses the fingerprint as a decryption key to decrypt the encrypted configuration data to extract the (original) configuration data. Because of the unlikelihood that any two chips will have identical manufacturing process variations, the fingerprint generated by the fingerprint element 18 is unique to the FPGA 10. Thus, by using inherent manufacturing process variations unique to the FPGA 10 to generate the fingerprint (e.g., the decryption key) each time the FPGA 10 is powered up, the FPGA 10 does not need an on-board non-volatile memory to store the decryption key, thereby saving silicon area and cost. Further, because the fabrication of the FPGA 10 does not depend on whether a particular manufacturing process technology has been developed for non-volatile memory, the FPGA 10 may be fabricated using the latest manufacturing process technology, thereby allowing for encryption of the FPGA 10's configuration data without sacrificing the competitive advantage realized by using the latest manufacturing process technology.

The competitive advantage realized by using the latest process technology, as opposed to using the previous generation process technology, is significant. For example, at present, while the latest available process for volatile memory is the 0.13 micron technology, the latest process available for non-volatile memory is the 0.25 micron technology. Since the 0.13 micron process technology produces chips that are about half as long and about half as wide as the 0.25 micron process technology, the chips produced by the 0.13 micron process technology are about one fourth the size, and therefore about one-fourth the cost, as chips produced by the 0.25 micron process technology. Thus, for example, by generating a decryption key within the FPGA 10 without using non-volatile memory, FPGAs incorporating embodiments of the present invention may be fabricated using 0.13 micron process technology. In contrast, FPGAs that include non-volatile memory to store the decryption key cannot presently be fabricated using 0.13 micron process technology, but rather must be fabricated using 0.25 micron process technology, which as discussed above is a competitive disadvantage.

Figure 2:
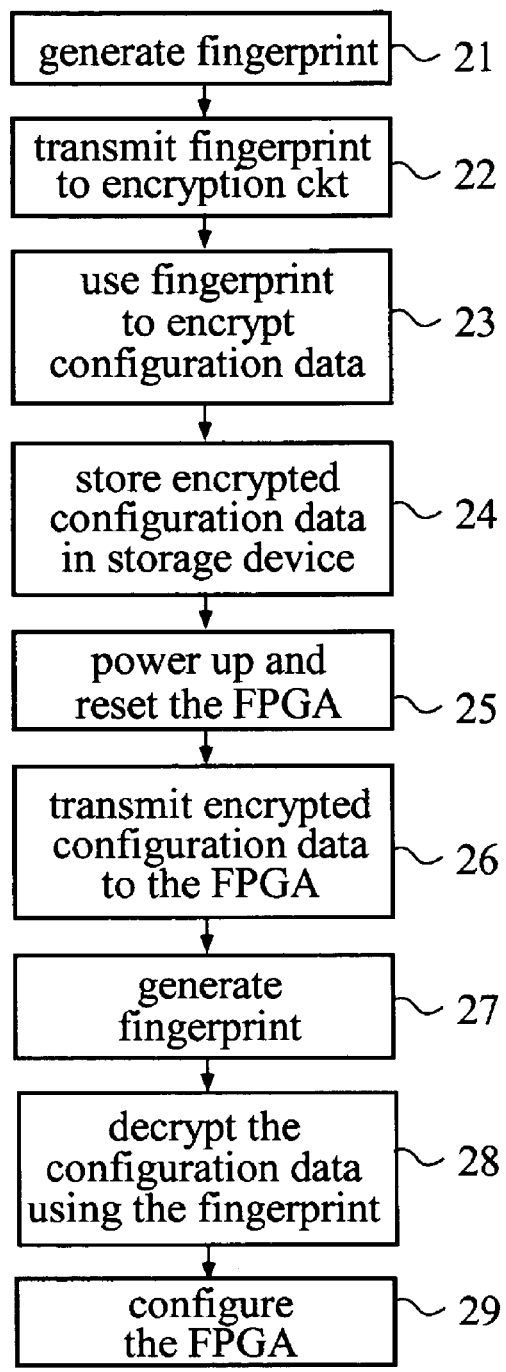
FIG. 2 is a flow chart illustrating configuration of an FPGA in accordance with one embodiment of the present invention.

Configuration of the FPGA 10 in one embodiment of the present invention is described below with reference to the flow chart of FIG. 2. During testing of the board 1, the FPGA 10 is powered up, and the fingerprint element 18 generates the fingerprint (step 21). The fingerprint is transmitted from the FPGA 10 to the encryption circuit 19 (step 22). Preferably, the fingerprint is transmitted from the FPGA 10 to the encryption circuit 19 in an encrypted form using, for example, a well-known public-key cryptography system, although other cryptography systems may be used. The encryption circuit 19 receives configuration data that embodies the circuit design desired to be implemented by the FPGA 10, and uses the fingerprint as an encryption key to encrypt the configuration data (step 23). Any suitable encryption technique may be used. The encrypted configuration data is then provided to and stored in the external storage device 20 in a well-known manner (step 24).

To configure the FPGA 10 to implement the desired circuit design, the board 1 is powered up, and the FPGA 10 waits until the power supply becomes stable at a predetermined voltage. Then, a power-on reset step resets the configurable logic elements 12 (and other elements not shown for simplicity) in a well-known manner (step 25). The external storage device 20 transmits the encrypted configuration data to the decryption circuit 16 of the FPGA 10 (step 26). The fingerprint element 18 generates the fingerprint (step 27). As mentioned earlier, the fingerprint generated by the fingerprint element 18 is a multi-bit binary representation of one or more inherent manufacturing process variations unique to the FPGA 10, and may be of any length. In one embodiment, the fingerprint is 150 bits.

The fingerprint element 18 provides the fingerprint to the decryption circuit 16, which in turn uses the fingerprint as a decryption key to decrypt the encrypted configuration data to extract the (original) configuration data (step 28). The configuration data is then provided to the configuration circuit 14, which uses the configuration data to program the configurable logic elements 12 to implement the desired circuit design (step 29). In this manner, in order to appropriate the configuration data, a person must determine the decryption key, thereby making illegal copying and/or use of the configuration data difficult.

The fingerprint element 18 may be any well-known circuit or software tool that generates a fingerprint indicative of manufacturing process variations unique to the FPGA 10. In some embodiments, differences in transistor threshold voltages caused by such process variations are used to generate the fingerprint. In one embodiment, the fingerprint element 18 includes a plurality of pairs of transistors, where differences in the threshold voltage between the transistors within each pair are used to generate a corresponding bit of the fingerprint.

Figure 3:
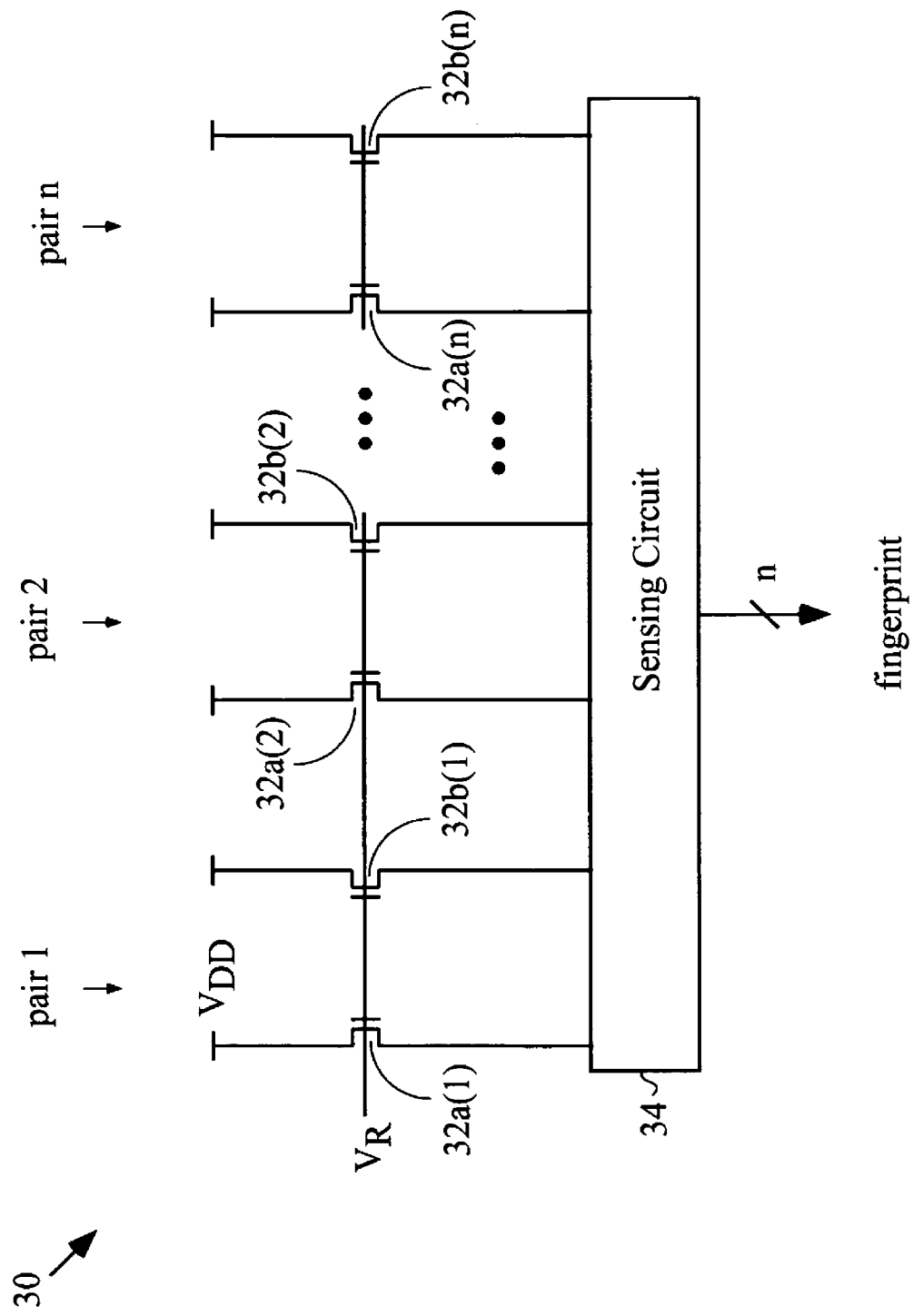
FIG. 3 is a block diagram illustrating one embodiment of the fingerprint element of the present invention.

Referring to FIG. 3, the fingerprint element 30, which is one embodiment of the fingerprint element 18, includes a plurality of transistor pairs 32a(1)-32b(1) to 32a(n)-32b(n) connected between a power supply $V_{DD}$ and a sensing circuit 34. A read voltage $V_R$ having a magnitude within the range of transistor threshold voltage variations is applied to the gates of each of the transistor pairs 32a(1)-32b(1) to 32a(n)-32b(n). Because the transistors 32a and 32b of each pair have different threshold voltages, when $V_R$ is applied thereto, one of the transistors in each pair turns on earlier than the other transistor in the pair. The sensing circuit 34 determines which transistor 32a or 32b of each transistor pair turns on earlier by, for example, detecting current flow in the transistors 32a and 32b, and in response thereto generates a corresponding bit of the n-bit fingerprint. For example, in one embodiment, for each of transistor pairs 32a(1)-32b(1) to 32a(n)-32b(n), the sensing circuit 34 generates a fingerprint bit of logic 1 if the first transistor 32a of the pair turns on before the second transistor 32b of the pair and, conversely, generates a fingerprint bit of logic 0 if the second transistor 32b of the pair turns on before the first transistor 32a of the pair. The fingerprint bits generated from corresponding transistor pairs 32a(1)-32b(1) to 32a(n)-32b(n) are combined (e.g., concatenated) to generate the n-bit fingerprint.

In some embodiments, the read voltage $V_R$ is slowly ramped from a first voltage to a second voltage, where the first voltage is less than all the threshold voltages of the transistor pairs 32a(1)-32b(1) to 32a(n)-32b(n), and the second voltage is greater than all the threshold voltages of the transistor pairs 32a(1)-32b(1) to 32a(n)-32b(n).

Because the manufacturing process variations that result in variations in transistor threshold voltages are random, the fingerprint generated by the fingerprint element 30 is unique to the FPGA 10. However, because transistor threshold voltages gradually vary over time, the fingerprint generated by the fingerprint element 30 may undesirably drift (i.e., change) over time. If allowed to drift, the fingerprint may no longer be able to decrypt the configuration data received from the external storage device 20.

Figure 4:
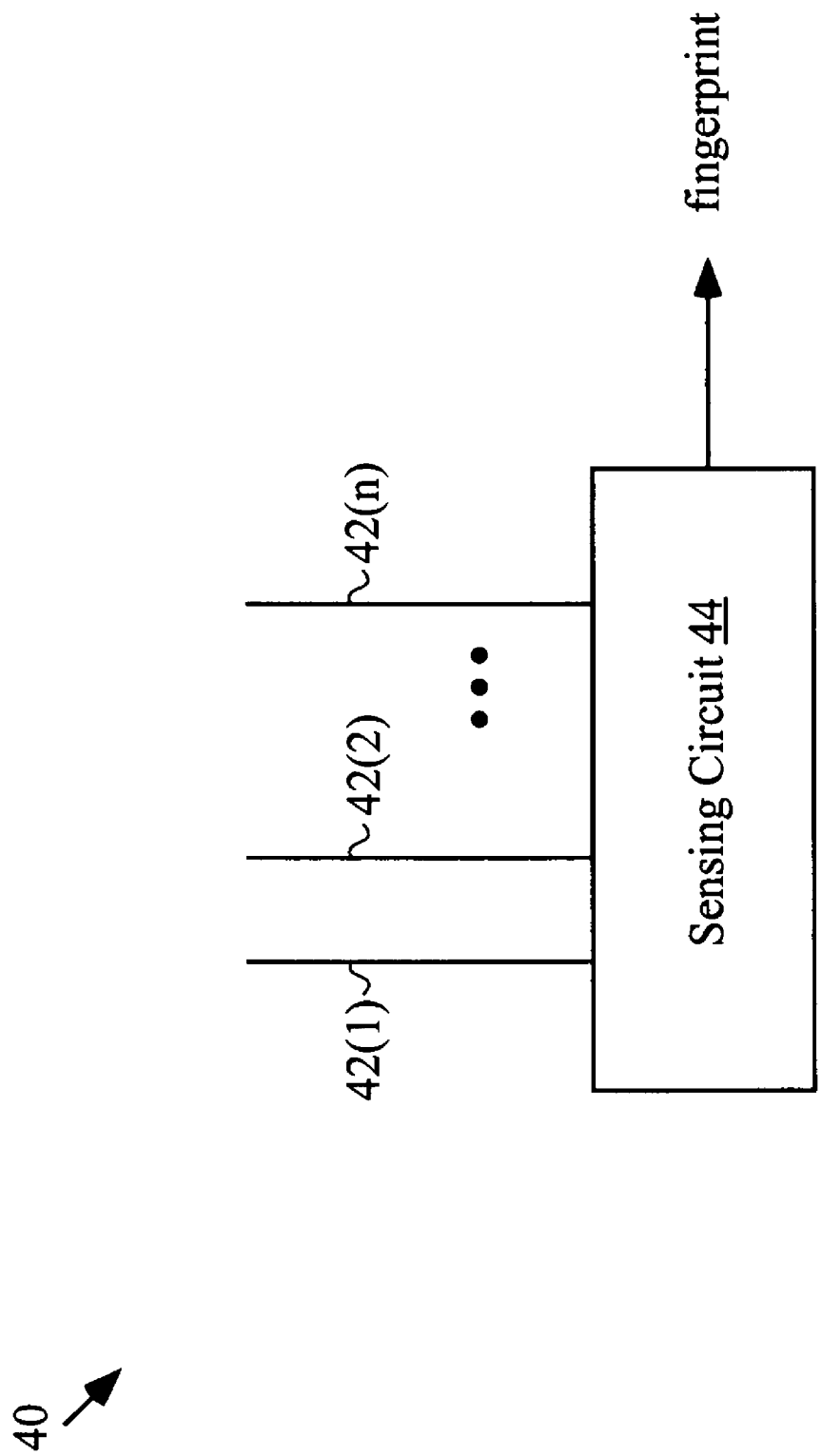
FIG. 4 is a block diagram illustrating another embodiment of the fingerprint element of the present invention.

Fingerprint drift may be avoided by generating the fingerprint according to manufacturing process variations that do not change over time. In one embodiment, the fingerprint element 18 includes a plurality of line segments whose deviation from a predetermined line width is used to generate corresponding bits of the fingerprint. For example, FIG. 4 shows a fingerprint element 40 including a plurality of line segments 42(1)-42(n) connected to a sensing circuit 44. For each line segment 42(1)-42(n), the sensing circuit 44 determines whether its line width is less than the predetermined line width, and generates a corresponding bit of the fingerprint accordingly. For example, if the line width of a line segment 42 is less than the predetermined line width, then the sensing circuit 44 generates a corresponding fingerprint bit of logic 0, and conversely, if the line width of the line segment 42 is not less than the predetermined line width, then the sensing circuit 44 generates a corresponding fingerprint bit of logic 1. The sensing circuit 44 may determine the relative line width of line segments 42(1)-42(n) using any well-known electrical technique. The statistical variation of the line widths may be maximized by fabricating the line widths as narrow as possible. Because line widths do not vary over time, the fingerprint generated by the fingerprint element 40 remains constant over time.

Figure 5:
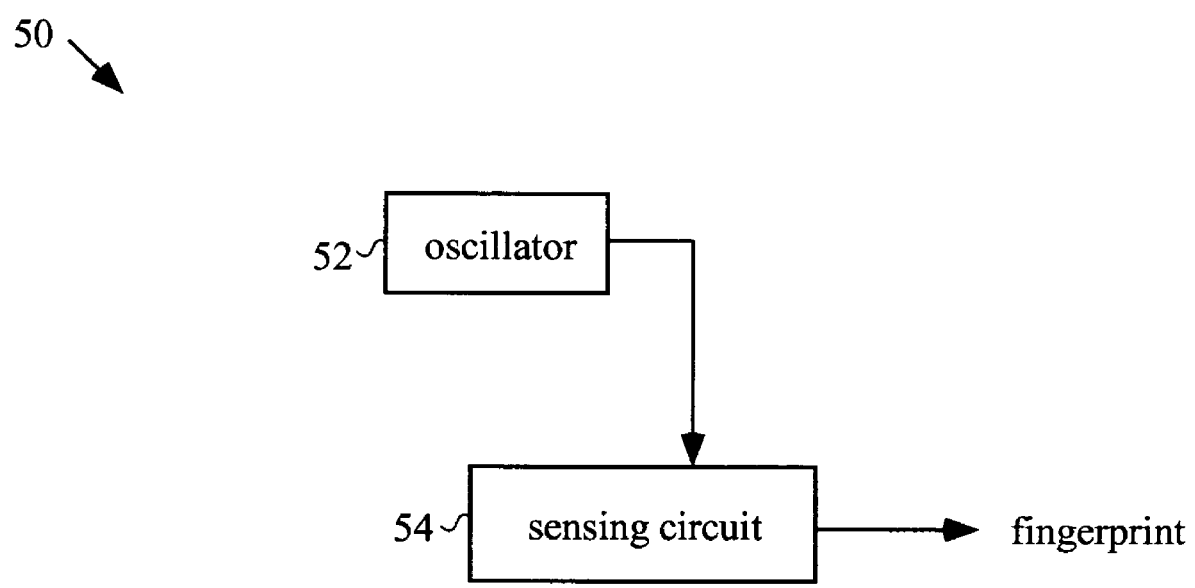
FIG. 5 is a block diagram illustrating yet another embodiment of the fingerprint element of the present invention.

In other embodiments, propagation delays of circuit elements on the FPGA 10 are measured and used to generate the fingerprint in a well-known manner. In one embodiment, an oscillator within the FPGA 10 is used to generate the fingerprint. FIG. 5 shows a fingerprint element 50 including an oscillator 52 and a sensing circuit 54. Because transistor delays are sensitive to manufacturing process variations, which as described above are random, the specific frequency of the fingerprint oscillator 52 on the FPGA 10 is unique. To generate the fingerprint, power is applied to the oscillator 52, and the number of times that the oscillator 52 switches during a predetermined time interval is counted. The resultant binary equivalent of the oscillator count is then used as the fingerprint. Reference for the predetermined time interval, which may be of any suitable duration, may be provided by well-known delay locked loops (DLL) within the configurable logic elements 12 of the FPGA 10 (see also FIG. 1). Thus, although shown in FIG. 5 as internal to the fingerprint element 50, in other embodiments, the oscillator 52 may be external to the fingerprint element 50, e.g., the oscillator 52 is fabricated in or implemented by the configurable logic elements 12 (see also FIG. 1). In some embodiments, the oscillator 52 is implemented within a CLB by configuring the CLB as an inverter with feedback. In such embodiments, the CLB may be within either the fingerprint element 50 or the configurable logic elements 12.

However, because transistor delays are sensitive to temperature and voltage fluctuations, the frequency of the oscillator 52 may be sensitive to temperature and voltage fluctuations. As a result, the fingerprint element 50 may not generate the same fingerprint when the FPGA 10 is exposed to significant temperature or voltage fluctuations, thereby resulting in fingerprint drift. Accordingly, the following embodiments provide immunity from fingerprint drift resulting from temperature and voltage fluctuations.

Figure 6:
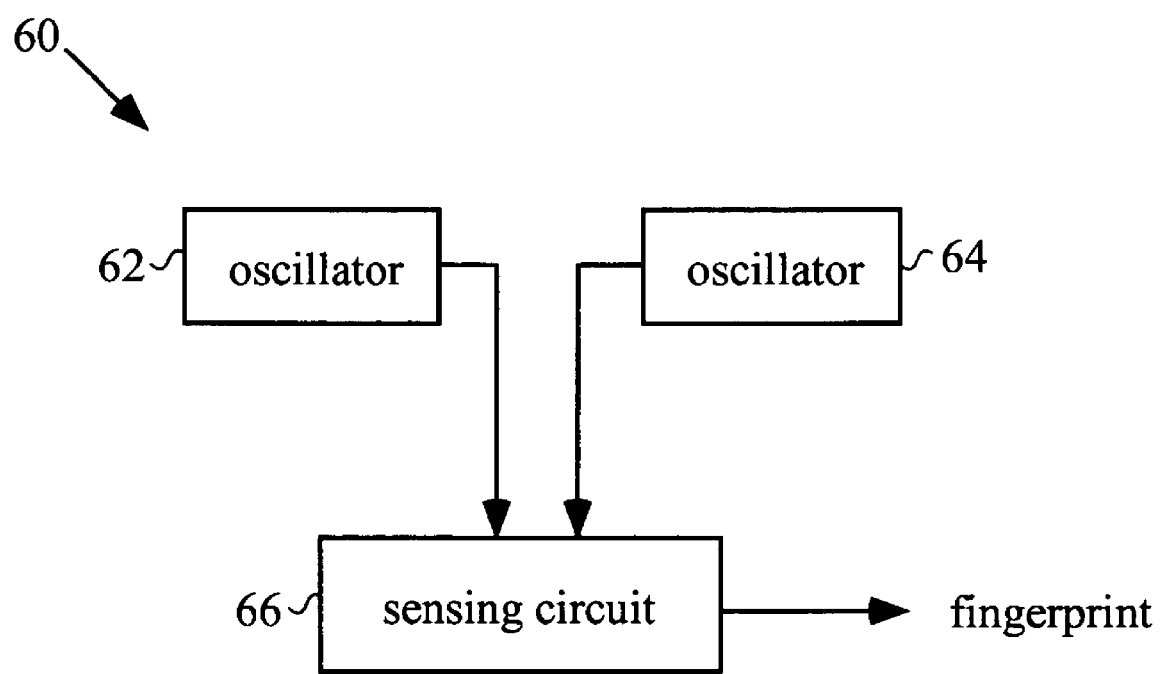
FIG. 6 is a block diagram illustrating still another embodiment of the fingerprint element of the present invention.

In one embodiment, a ratio of oscillator counts is used to generate the fingerprint in order to eliminate the effect of temperature and voltage fluctuations. For example, FIG. 6 shows a fingerprint element 60 including first and second oscillators 62 and 64 connected to a sensing circuit 66. When power is applied, the sensing circuit 66 counts the number of times that each oscillator 62 and 64 switches during the predetermined time interval. Reference for the predetermined time interval may be provided by a DLL as described above with respect to the fingerprint element 50. The sensing circuit 66 divides the count value of one oscillator by the count value of the other oscillator to generate a ratio, the binary equivalent of which is used as the fingerprint. Because the respective frequencies of oscillators 62 and 64 vary equally over temperature and voltage fluctuations, the ratio of their resultant count values, and therefore the fingerprint generated therefrom, remains constant over temperature and voltage fluctuations. Although shown in FIG. 6 as internal to the fingerprint element 60, in other embodiments the oscillators 62 and 64 may be external to the fingerprint element 60. In some embodiments, the oscillators 62 and 64 are implemented using CLBs, as described above.

Referring again to FIG. 5, in another embodiment, the sensing circuit 50 is configured to ignore the m least significant bits of the n-bit oscillator count value provided from the oscillator 52, with the remaining n-m bits of the oscillator count value being used as the fingerprint. By truncating the m least significant bits of the oscillator count value, the resultant shortened fingerprint represents a range of oscillator count values, and therefore includes a built-in tolerance for frequency variations resulting from temperature and voltage fluctuations. However, because sensing circuit 54 must be pre-configured to ignore the m least significant bits when generating the fingerprint, the frequency range represented by shortened fingerprint is fixed. Further, if the frequency range represented by the shortened fingerprints of two or more different FPGAs 10 overlap, then the resulting decryption keys may be same, which in turn diminishes security.

While particular embodiments of the present invention have been shown and described, it will be obvious to those skilled in the art that changes and modifications may be made without departing from this invention in its broader aspects and, therefore, the appended claims encompass within their scope all such changes and modifications as fall within the true spirit and scope of this invention. For example, although in the above examples the configuration data is described as being stored in encrypted format in the storage device 20, in other embodiments, the configuration data may be stored in the storage device 20 in un-encrypted form. In such embodiments, the storage device 20 also includes a well-known encryption circuit that encrypts the configuration data using the fingerprint as the encryption key prior to its transmission to the FPGA 10. Further, although described above as using the fingerprint for both the decryption key and the encryption key, in actual embodiments, a key other than the fingerprint may be used as the encryption key.

What is claimed is:

1. A method of securing communication of configuration data between an integrated circuit device and an external storage device, the method comprising:
   generating a fingerprint within the integrated circuit device, the fingerprint representing an inherent manufacturing process characteristic unique to the integrated circuit device, wherein generating the fingerprint includes providing a plurality of line segments on the integrated circuit device, determining whether a width of each line segment is less than a predetermined value, and generating, for each line segment, a corresponding bit of the fingerprint in response to the act of determining;
   transmitting encrypted configuration data from the storage device to the integrated circuit device;
   generating a decryption key using the fingerprint; and
   decrypting the encrypted configuration data in the integrated circuit device using the decryption key to extract the configuration data.

2. The method of claim 1, wherein the fingerprint is generated during power-up of the integrated circuit device.

3. The method of claim 1, further comprising:
   configuring the integrated circuit device using the decrypted configuration data.

4. The method of claim 1, further comprising:
   generating an encryption key using the fingerprint;
   encrypting the configuration data using the encryption key; and
   storing the encrypted configuration data in the external storage device.

5. A method of securing communication of configuration data between an integrated circuit device and an external storage device, the method comprising:
   generating a fingerprint within the integrated circuit device, the fingerprint is reproducible and is also unique to the integrated circuit device and represents an inherent manufacturing process characteristic unique to the integrated circuit device;
   transmitting encrypted configuration data from the storage device to the integrated circuit device;
   generating a decryption key using the fingerprint; and
   decrypting the encrypted configuration data in the integrated circuit device using the decryption key to extract the configuration data,
   wherein generating the fingerprint further comprises:
      applying a read voltage to a plurality of transistor pairs;
      determining, for each transistor pair, whether a first transistor or a second transistor of the pair turns on earlier by detecting current flow in the first transistor and the second transistor; and
      generating, for each transistor pair, a corresponding bit of the fingerprint, the bit having a value that depends on which one of the first transistor or the second transistor was determined to turn on earlier.

6. The method of claim 5, wherein generating the fingerprint includes determining which transistor of a transistor pair turns on earlier due to differences in the transistor threshold voltages.

7. The method of claim 6, wherein determining which transistor of a transistor pair turns on earlier occurs by detecting current flow in the transistor pair, and generating a bit of the fingerprint based on which transistor of the transistor pair turns on earlier.

8. The method of claim 5, wherein the fingerprint is generated during power-up of the integrated circuit device.

9. The method of claim 5, further comprising:
   configuring the integrated circuit device using the decrypted configuration data.

10. A method of securing communication of configuration data between an integrated circuit device and an external storage device, the method comprising:
    generating a fingerprint within the integrated circuit device, wherein the fingerprint is reproducible and is also unique to the integrated circuit device and represents an inherent manufacturing process characteristic unique to the integrated circuit device;
    receiving, by the integrated circuit device, encrypted configuration data from the external storage device;
    generating a decryption key using the fingerprint; and
    decrypting the encrypted configuration data in the integrated circuit device using the decryption key to extract the configuration data,
    wherein generating the fingerprint includes an operation selected from the group including:
       determining whether a width of each of a plurality of line segments is less than a predetermined value, and generating, for each of the plurality of line segments, a corresponding bit of the fingerprint based on the act of determining, or
       counting a first number of oscillations of a first oscillator during a predetermined time interval and counting a second number of oscillations of a second oscillator during the predetermined time interval, and generating a ratio between the first number and the second number, wherein the ratio represents the fingerprint, or
       determining whether a first transistor of a transistor pair or a second transistor of the transistor pair turns on earlier by detecting current flow in the first transistor and the second transistor, and generating a corresponding bit of the fingerprint, the bit having a value that depends on which one of the first transistor or the second transistor was determined to turn on earlier.

11. The method of claim 10, further comprising:
generating an encryption key using the fingerprint;
encrypting the configuration data using the encryption key; and
storing the encrypted configuration data in the external storage device.

12. The method of claim 10, wherein the fingerprint is generated during power-up of the integrated circuit device.

13. A method of securing communication of configuration data between an integrated circuit device and an external storage device, the method comprising:
generating a fingerprint within the integrated circuit device, wherein the fingerprint is reproducible and is also unique to the integrated circuit device and represents an inherent manufacturing process characteristic unique to the integrated circuit device;
receiving, by the integrated circuit device, configuration data from the external storage device; and
checking validity of the configuration data using the fingerprint,
wherein generating the fingerprint includes an operation selected from the group including:
determining whether a width of each of a plurality of line segments is less than a predetermined value, and generating, for each of the plurality of line segments, a corresponding bit of the fingerprint based on the act of determining, or
counting a first number of oscillations of a first oscillator during a predetermined time interval and counting a second number of oscillations of a second oscillator during the predetermined time interval, and generating a ratio between the first number and the second number, wherein the ratio represents the fingerprint, or
determining whether a first transistor of a transistor pair or a second transistor of the transistor pair turns on earlier by detecting current flow in the first transistor and the second transistor, and generating a corresponding bit of the fingerprint, the bit having a value that depends on which one of the first transistor or the second transistor was determined to turn on earlier.

14. The method of claim 13, further comprising:
generating an encryption key using the fingerprint;
encrypting the configuration data using the encryption key; and
storing the encrypted configuration data in the external storage device,
wherein checking validity of the configuration data using the fingerprint comprises:
generating a decryption key using the fingerprint; and
decrypting the encrypted configuration data in the integrated circuit device using the decryption key to extract the configuration data.

15. The method of claim 14, further comprising:
configuring the integrated circuit device using the decrypted configuration data.

16. The method of claim 13, wherein the fingerprint is generated during power-up of the integrated circuit device.

* * * * *